United States Patent Office 3,798,298
Patented Mar. 19, 1974

3,798,298
PROCESS FOR PREPARING A FIBRE FLEECE
Pieter C. A. van Krimpen, Stein, and Victor M. B. Wetzler, Munstergeleen, Netherlands, assignors to Stamicarbon N.V., Heerlen, Netherlands
Filed Feb. 1, 1972, Ser. No. 222,592
Claims priority, application Netherlands, Feb. 6, 1971, 7101603
Int. Cl. D01f 3/10
U.S. Cl. 264—210 F         4 Claims

ABSTRACT OF THE DISCLOSURE

A process and an apparatus for preparing a fibre fleece, in which a polymer material is spun into filaments which are subsequently so cooled that the major portion of the polymer material is in crystallized form, whereupon the filaments are heated to a temperature close to the melting point, led over a contact area, pneumatically stretched and spread on a conveying surface.

---

Figure 1:
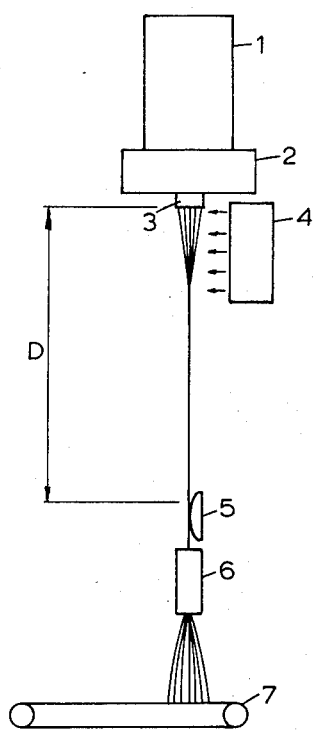

The invention relates to a process and a device for preparing a fibre fleece, in which a polymer material is spun into filaments, which are drawn pneumatically and are subsequently laid down on a conveying plane.

In this known process the filaments are passed through an injector to which compressed air is supplied, which air, whilst streaming through the injector, exerts a drawing force on the filaments. This causes the filaments to be stretched, the cross-sectional reduction principally taking place immediately after the material has left the spinning device and is still in a molten, amorphous condition. As a result of this, the orientation of the material, aimed at by the drawing procedure and, hence, the strength of the eventual product, are little.

It has been proposed for the temperature of the compressed air supplied to the injector to be increased in order to achieve as yet the orientation of the polymer crystals in the drawing device, which is desired in view of improving the mechanical properties of the filaments. However, this proposal has not led to the contemplated improvement of these properties being achieved.

The invention provides a process in which substantial improvement of the mechanical properties of the filaments and fleeces prepared thereof is obtained.

This has been achieved in that according to the invention the filaments are so cooled after having left the spinning device that the major portion of the polymer material is in crystallized form, whereupon the filaments, prior to entering the pneumatic drawing device, are heated to a point close to the melting point of the polymer material and are led over a contact area.

Drawing of the filaments is now principally effected in a place where they have been given a plastic condition by heating. Seeing that the temperature of the filaments, in this place, lies below the melting point of the polymer material, the crystallization of the material, achieved by the previous cooling, is retained. The crystals are orientated by the drawing force exerted by the pneumatic drawing device on the filaments, as a result of which the mechanical properties of the filaments are substantially improved. Since the filaments, when moving over the contact area, are subject to a certain resistance, the place is localized where the cross-sectional reduction of the filaments takes place, which has a favorable influence on the orientation of the crystals. As a result of cold air now being supplied to the drawing device, the orientation achieved is fixed in this device.

The filaments are preferably heated to a temperature lying 10 to 80° C. below the melting point of the polymer material. The crystallization realized by means of the previous cooling is then retained, whilst the material is nevertheless sufficiently plastic to allow of being drawn to the desired value.

Heating may be effected by means of hot air, for instance by passing the filaments through a shaft through which hot air is streaming. However, preference is given to the filaments being heated when moving over the contact area, to which end the contact area may be heated electrically, or in another way, from the outside.

Cooling of the filaments, after they have left the spinning device, can be effected by supplying cooling air and/or by choosing so large a distance between the spinning device and the heating means that the temperature of the filaments, through cooling in the ambient air, decreases to below the crystallization point of the polymer material. When choosing the distance between the spinning device and the heating means, also the crystallization rate of the material plays a part, so that, in the case of polymers which crystallize only slowly, a larger distance should be chosen than would be necessary in view of the contemplated cooling. This distance, as a rule, amounts to at least one metre. For polyolefins, the distance for optimum processing amounts to 2 to 7 m.

When applying the process according to the invention very good process control is possible, which is particularly of importance in processing polyethylene and polypropylene and the crystalline copolymers of ethylene or propylene. The product obtained has a very constant quality and great strength. An important advantage further is that the drawing air to be applied may have a lower pressure and temperature than is the case in the known process.

The invention will be elucidated in more detail on the basis of the drawing.

FIG. 1 schematically shows the arrangement of a device according to the invention.

Figure 2:
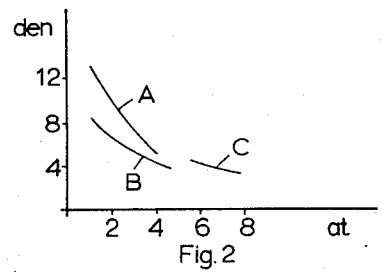
Figure 5:
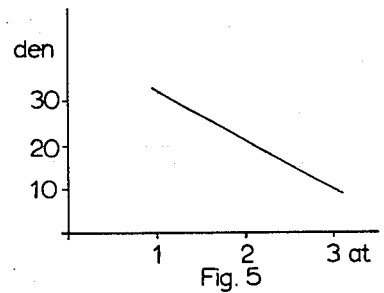
Figure 3:
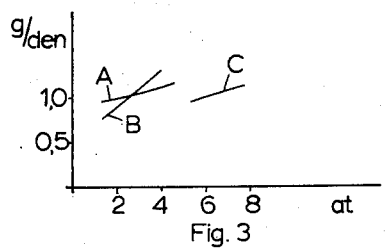
Figure 6:
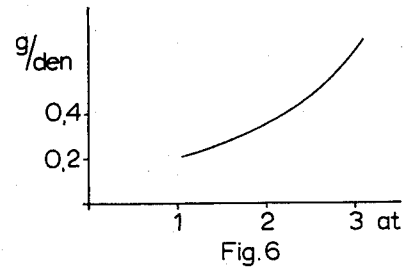
Figure 4:
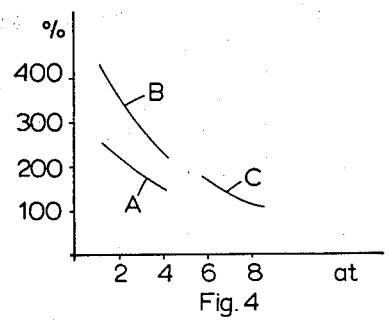
Figure 7:
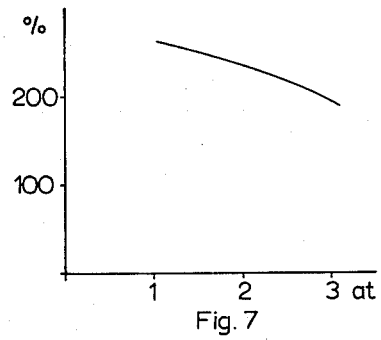

FIGS. 2-4, graphs relating to Example I;
FIGS. 5-7, graphs relating to Example II; and
FIGS. 8-19, graphs relating to Example III.

In FIG. 1, 1 represents an extrusion machine, with a spinning head 2 and a spinning nozzle 3. The filaments leaving the spinning nozzle are cooled by means of cooling air supplied by a blowing device 4 which is provided immediately below the spinning nozzle. At a distance D below the spinning nozzle a heated plate 5 is arranged. The filaments are subjected to a drawing force by means of an injector 6 and subsequently spread on a conveyer belt 7, where they form a fleece.

EXAMPLE I

Polymer: high-density polyethylene; melting point 125° C.; melt index 8; specific gravity 0.9599.
Spinning nozzle: 35 holes, dia.=0.3 mm.
Distance from spinning nozzle to heated plate: D= 550 cm.
Production per hole: 0.28 g./min.
Spinning head temperature: 310° C.
The results are summarized in the FIGS. 2, 3 and 4. The compressed-air pressure for the injector 6 has invariably been plotted horizontally.

The vertical axis indicates in FIG. 2 the weight of the individual filament, expressed in deniers; in FIG. 3 the strength in g./denier and in FIG. 4 the breaking strength in percent.

The lines A, B and C in these figures indicate the following experiments:

A=with heated plate, without cooking air,
B=with heated plate, with cooling air, and
C=without heated plate, without cooling air.

Cheap process control, with a low compressed-air pressure and a low compressed-air temperature (20° C.) and a great strength were obtained, in which a compressed-air pressure of 4 ats. g. was applied and a heated plate was used which had a length of 20–50 cm. and a temperature of about 100° C., whilst, under the spinning nozzle, cooling was effected with air of 65% relative humidity, and a velocity of 3 m./sec. over a distance of 150 cm.

EXAMPLE II

Polymer: low-density polyethylene; melting point 110° C.; melt index 8.5; specific gravity 0.929.
Spinning nozzle: 35 holes, dia.=0.3 mm.
Distance from spinning nozzle to heated plate: D= 550 cm.
Production per hole: 0.28 g./min.
Spinning head temperature: 290° C.

The Experiments A, B and C according to Example I were carried out from which it appeared that only with application of a heated plate and without additional air-cooling (Experiment A) processing was possible. The results thereof are shown in the FIGS. 5, 6 and 7.

EXAMPLE III

Figure 8:
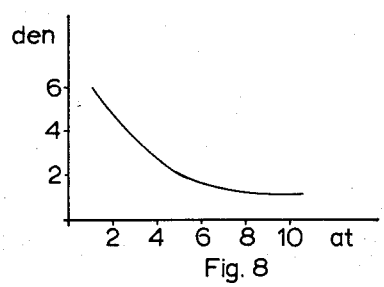
Figure 11:
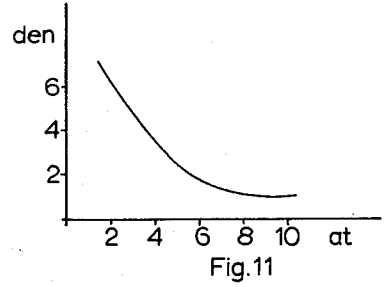
Figure 9:
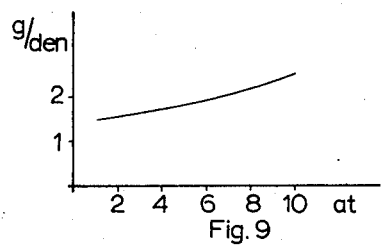
Figure 12:
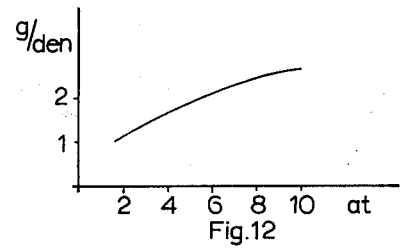
Figure 10:
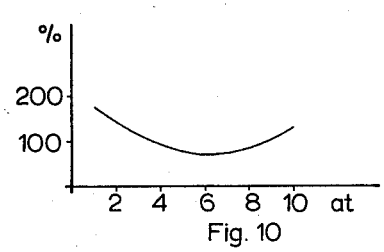
Figure 13:
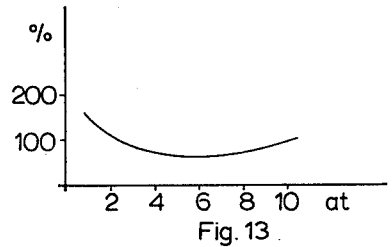
Figure 14:
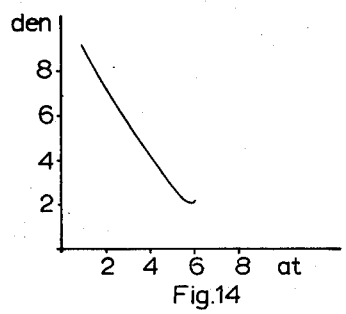
Figure 17:
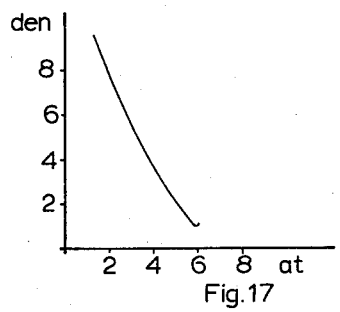
Figure 15:
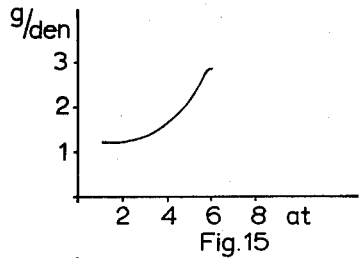
Figure 18:
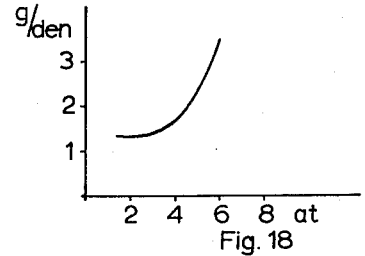
Figure 16:
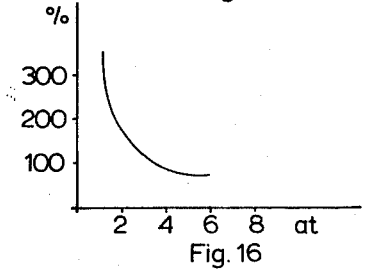
Figure 19:
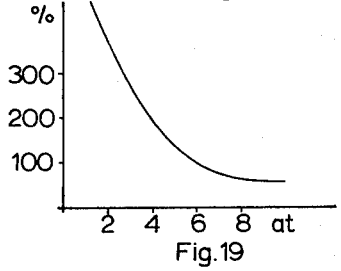

Polymer: isotactic polypropylene; melting point 160° C.; melt index 4.3; specific gravity 0.9072.
Spinning nozzle: 35 holes, dia.=0.3 mm.
Distance from spinning nozzle to heated plate: D= 550 cm.
Spinning head temperature: 290° C.
The following experiments were carried out:

(a) Without heated plate and without additional cooling air, the results being shown in the FIGS. 8–10;

(b) Without heated plate and with additional cooling air (3.0 m./sec.) the results being shown in the FIGS. 11–13;

(c) With heated plate (100–120° C.) and without additional cooling air, the results being shown in the FIGS. 14–16, and finally (d) With heated plate (100–120° C.) and with additional cooling air (3.0 m./sec.), the results being shown in the FIGS. 17–19.

The combination according to (d) (FIGS. 17–19) appears to be particularly attractive at a compressed-air pressure for the injector of 5–6 ats. g.

A great strength is achieved at a low compressed-air pressure and a low (20° C.) temperature. It is of importance that this strength be obtained at a relatively low spinning head temperature. For the sake of comparison the following tests were conducted without using a heated plate but with application of compressed air of different temperatures.

(a) Polymer: high-density polyethylene; melting point 125° C.; melt index 8; specific gravity 0.9599.
Spinning nozzle: 35 holes, dia.=0.3 mm.
Distance from spinning nozzle to injector=550 cm.
Production per hole: 0.28 g./min.
Spinning head temperature: 310° C.
Compressed-air pressure 3 ats. g.

The result was as follows:

| Temperature compressed air | Strength (g./den.) | |
|---|---|---|
| | Without additional cooling air | With additional cooling air |
| 20° | 0.9 | 1.0 |
| 80° | 0.8 | 0.9 |
| 150° | 0.7 | 0.8 |

These results are distinctly worse than shown in FIG. 3 by the lines A and B (Example 1).

(b) Polymer: Isotactic polypropylene; melting point 160° C.; melt index 7.5; specific gravity 0.909.
Spinning nozzle: 35 holes, dia.=0.3 mm.
Distance from spinning nozzle to injector=550 cm.
No additional cooling air

| | | | | |
|---|---|---|---|---|
| Spinning head temperature, ° C. | 320 | | 340 | |
| Compressed-air pressure, ats. g. | 3 | | 5.5 | |
| Compressed-air temperature, ° C. | 20 | 80 | 20 | 110 |
| Denier | 10.3 | 13.1 | 7.1 | 10.7 |
| Strength, g./den. | 1.5 | 1.3 | 2.1 | 1.5 |
| Elongation at break, percent | 300 | 560 | 165 | 325 |

The results are comparable to those according to the FIGS. 15 and 18.

What is claimed is:

1. A process for preparing a fibre fleece, consisting essentially of spinning a polymer material into filaments, cooling said filaments in such a way that the major portion of the polymer material is in the crystallized form, thereafter leading said filaments over a contact area and heating the filaments to a temperature lying about 10–80° C. below the melting point of the polymer material while the filaments are moving over said contact area, and immediately thereafter pneumatically stretching said filaments, and spreading the stretched filaments on the conveying surface, wherein the only solid surface which the filaments contact between the point of spinning and the point of pneumatic stretching is said contact area.

2. Process according to claim 1, wherein the filaments are cooled in the ambient air, with the distance between the spinning and the heating steps about 2–7 meters.

3. Process according to claim 1, wherein said polymer is a polyolefin.

4. Process according to claim 3, wherein said polyolefin is selected from the group consisting of polyethylene, polypropylene, and crystalline copolymers of ethylene or propylene.

References Cited

UNITED STATES PATENTS

| | | | |
|---|---|---|---|
| 2,635,389 | 4/1953 | Toulmin | 49—77 |
| 2,577,915 | 12/1951 | Piller et al. | 264—210 F |
| 2,708,813 | 5/1955 | Bourgeaux | 264—176 F |
| 2,957,747 | 10/1960 | Bowling | 264—176 F |
| 3,120,027 | 2/1964 | Baggett et al. | 264—210 F |
| 3,156,752 | 11/1964 | Cope | 264—345 |
| 3,317,980 | 5/1967 | Jaeggli | 28—71.3 |
| 3,338,992 | 8/1967 | Kinney | 264—210 F |
| 3,422,176 | 1/1969 | Jamison | 264—207 |
| 3,511,905 | 5/1970 | Martin | 264—210 F |

FOREIGN PATENTS

| 7,903 | 7/1962 | Japan | 264—210 |
|---|---|---|---|

JAY H. WOO, Primary Examiner

U.S. Cl. X.R.

264—234; 290—290